(12) United States Patent
Duncan et al.

(10) Patent No.: US 9,182,766 B2
(45) Date of Patent: Nov. 10, 2015

(54) SWITCHING VOLTAGE REGULATOR

(71) Applicant: QUALCOMM Incorporated, San Diego, CA (US)

(72) Inventors: Joseph Duncan, San Francisco, CA (US); Charles Derrick Tuten, Scottsdale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 13/793,766

(22) Filed: Mar. 11, 2013

(65) Prior Publication Data
US 2014/0253081 A1  Sep. 11, 2014

(51) Int. Cl.
| | |
|---|---|
| H02M 3/157 | (2006.01) |
| G05F 1/10 | (2006.01) |
| H02M 1/32 | (2007.01) |
| H02M 3/158 | (2006.01) |
| H02M 1/00 | (2007.01) |

(52) U.S. Cl.
CPC . *G05F 1/10* (2013.01); *H02M 1/32* (2013.01); *H02M 3/157* (2013.01); *H02M 3/158* (2013.01); *H02M 3/1588* (2013.01); *H02M 2001/0025* (2013.01); *H02M 2001/0035* (2013.01); *Y02B 70/1466* (2013.01); *Y02B 70/16* (2013.01)

(58) Field of Classification Search
CPC ............ H02M 3/156; H02M 2001/0035
USPC .................................. 323/282–285
See application file for complete search history.

(56) References Cited

U.S. PATENT DOCUMENTS

| | | | |
|---|---|---|---|
| 5,528,125 A | 6/1996 | Marshall et al. | |
| 7,948,729 B2 | 5/2011 | Zhang et al. | |
| 8,294,388 B2 | 10/2012 | Wong et al. | |
| 2007/0114985 A1* | 5/2007 | Latham et al. | 323/283 |
| 2008/0266738 A1 | 10/2008 | Kimber | |
| 2010/0253250 A1 | 10/2010 | Marvelly et al. | |
| 2010/0320986 A1* | 12/2010 | Collins | 323/284 |
| 2011/0018515 A1 | 1/2011 | McCloy-Stevens | |
| 2011/0089925 A1 | 4/2011 | Ishida et al. | |
| 2011/0221412 A1* | 9/2011 | Li et al. | 323/283 |
| 2011/0234190 A1* | 9/2011 | Kenly et al. | 323/283 |
| 2012/0139514 A1 | 6/2012 | Paatero | |
| 2013/0207630 A1* | 8/2013 | Rahardjo et al. | 323/283 |

FOREIGN PATENT DOCUMENTS

| | | |
|---|---|---|
| EP | 0709948 A1 | 5/1996 |
| JP | 2005253219 A | 9/2005 |

OTHER PUBLICATIONS

International Search Report and Written Opinion—PCT/US2014/020885—ISA/EPO—Sep. 18, 2014.

* cited by examiner

*Primary Examiner* — Gary L. Laxton
*Assistant Examiner* — Kyle J Moody
(74) *Attorney, Agent, or Firm* — Arent Fox LLP

(57) ABSTRACT

Exemplary embodiments are related to a switching voltage regulator. A switching voltage regulator may include a current limit detector configured to detect an over-current condition. The switching voltage regulator may further include a pulse-width modulation (PWM) module coupled to the current limit detector and configured to convey a PWM signal based on a programmed switching frequency and an output voltage and in response to the over-current condition.

24 Claims, 9 Drawing Sheets

SWITCHING VOLTAGE REGULATOR

BACKGROUND

1. Field

The present invention relates generally to switching voltage regulators. More specifically, the present invention relates to embodiments for operating a switching voltage regulator at or near a current limit with enhanced efficiency, and without impacting regulation.

2. Background

An electronic device, such as a mobile telephone, may include a voltage regulator that receives an input voltage from a power supply and generates an output voltage for a load. An integrated circuit may include a voltage regulator for providing a stable voltage reference for on-chip components such as a digital component, an analog component, and/or a radio-frequency (RF) component.

A voltage regulator may comprise a switching voltage regulator, which rapidly switches a power transistor between triode (i.e., completely on) and cutoff (i.e., completely off) with a variable duty cycle. A resulting rectangular waveform is low pass filtered in order to produce a nearly constant output voltage proportional to the average value of the duty cycle. One advantage of a switching voltage regulator compared to a linear voltage regulator is greater efficiency because the switching transistor dissipates little power as heat in either a saturated state or a cutoff state.

As understood by a person having ordinary skill in the art, limiting an output current of a switching voltage regulator is important to protect from output short-circuit conditions, which can cause almost immediate permanent damage to an associated device. Conventional devices and methods for reducing output current may cause a severe and immediate reduction in the output current when an over-current condition is detected, even transiently, thus causing an output voltage to fall out of regulation.

A need exists for an enhanced switching voltage regulator. More specifically, a need exists for embodiments related to operating a switching voltage regulator at or near a current limit with enhanced efficiency and regulation.

DETAILED DESCRIPTION

Figure 1:
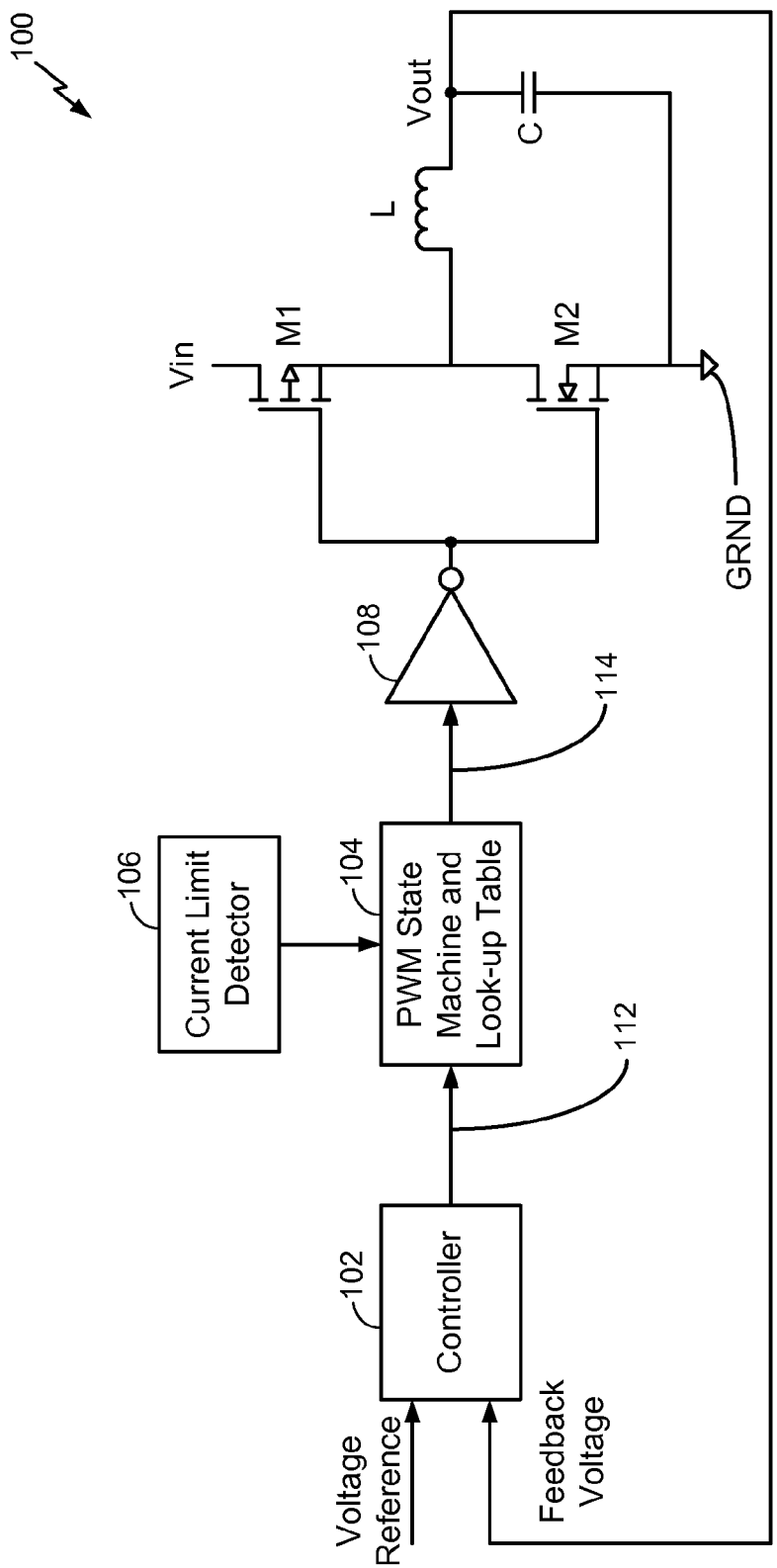
FIG. 1 depicts a switching voltage regulator, according to an exemplary embodiment of the present invention.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As noted above, conventional voltage regulators, upon detection of an over-current condition, may cause a severe and immediate reduction of an output current (e.g., the output current may be reduced to substantially zero amps), which may cause an output voltage to fall out of regulation. Stated another way, conventional voltage regulators, upon detection of an over-current condition, may generate a pulse-width modulation signal for causing the output current to decrease to zero amps.

Exemplary embodiments, as described herein, are directed to devices, systems, and methods for operating a switching voltage regulator near an over-current protection limit without adversely impacting efficiency or risking severe disruption to the regulated output voltage. According to one exemplary embodiment, a voltage regulator may include a current limit detector configured to detect an over-current condition. The voltage regulator may further include a pulse-width modulation (PWM) module coupled to the current limit detector and configured to convey a PWM signal based on a programmed switching frequency and an output voltage. According to another exemplary embodiment, a voltage regulator may include a current limit detector configured to detect an over-current condition. The voltage regulator may further include a pulse-width PWM module coupled to the current limit detector and configured to receive a first PWM signal and convey a second, modified PWM signal based on a programmed switching frequency and an output voltage and in response to a signal indicative of the over-current condition.

According to another exemplary embodiment, the present invention includes methods for operating a voltage regulator. Various embodiments of such a method may include receiving a first signal based on an output voltage of a switching voltage regulator and receiving a second signal indicative of an over-current condition. Further, the method may include conveying a PWM signal based on a programmed switching frequency and an output voltage of the switching voltage regulator and in response to receipt of the first signal and the second signal. In accordance with another exemplary embodiment, a method may include receiving a pulse-width modulation (PWM) signal and conveying a modified PWM signal based on a programmed switching frequency and an output voltage of a switching voltage regulator upon detection of an over-current condition.

Other aspects, as well as features and advantages of various aspects, of the present invention will become apparent to those of skill in the art though consideration of the ensuing description, the accompanying drawings and the appended claims.

FIG. 1 illustrates a switching voltage regulator 100, according to an exemplary embodiment of the present invention. By way of example only, switching voltage regulator 100 may comprise a buck converter. Switching voltage regulator 100, which is configured to receive an input voltage Vin and convey an output voltage Vout, includes a controller 102, a pulse-width modulation (PWM) state machine and lookup table 104, and a current limit detector 106. It is noted that PWM state machine and lookup table 104 may also be referred to herein as a "PWM module."

Switching voltage regulator 100 further includes an inverter 108, a switching element M1, and a switching element M2. By way of example only, switching element M1 may comprise a n-channel transistor and switching element M2 may comprise a p-channel transistor. As illustrated in FIG. 1, switching element M1 is coupled between input voltage Vin and switching element M2, which is further coupled to a ground voltage GRND. Switching voltage regulator 100 may also include an inductor L and a capacitor C, and may be configured to generate output voltage Vout.

Current limit detector 106 may be configured to determine if a measured output current (e.g., a current through inductor L) is greater than or equal to threshold current value. It is noted that the output current may be measured via any known and suitable manner. By way of example only, the output current may be determined by measuring a current through inductor L, measuring a current through a sense resistor, measuring a current across switching element M1, or any other known and suitable manner. Further, if current limit detector 106 determines that the output current is greater than or equal to the threshold current, current limit detector 106 may convey a signal to PWM module 104 indicative of an over-current condition (i.e., when an output current is equal to or greater than a current limit).

In addition, controller 102 may be configured to receive a reference voltage and output voltage Vout via a feedback path 110. In response to receipt of the reference voltage and output voltage Vout, controller 102 may generate and convey a requested pulse-width modulated (PWM) signal 112 to PWM module 104. PWM module 104 may be configured to receive PWM signal 112 and the signal from current limit detector 106. Further, PWM module 104 may be configured to convey an actual PWM signal 114 to inverter 108, which may convey a signal to a gate of each of switching elements M1 and M2 to cause either switching element M1 or switching element M2 to conduct for generating output voltage Vout.

During a contemplated operation of switching voltage regulator 100, in the event that PWM module 104 does not receive a signal from current limit detector 106 indicative of an over-current condition, PWM module 104 may convey actual PWM signal 114, which is substantially equal to requested PWM signal 112, to inverter 108. Stated another way, if an over-current condition is not detected, actual PWM signal 114, which is conveyed from PWM module 104 to inverter 108, is substantially equal to requested PWM signal, which is conveyed from controller 102 to PWM module 104.

Conversely, in the event that current limit detector 106 determines that the output current is greater than or equal to the threshold current and, thus, conveys a signal to PWM module 104 indicative of a over-current condition, PWM module 104 may generate and convey actual PWM signal 114, which is modified with respect to requested PWM signal 112. According to various exemplary embodiments of the present invention, in response to receipt of a signal, via current limit detector 106, indicative of an over-current condition, PWM module 104 may be configured to generate actual PWM signal 114 based on output voltage Vout and a programmed switching frequency of switching voltage regulator 100. More specifically, PWM module 104 may, via a lookup table (LUT), and based on the programmed switching frequency and output voltage Vout, determine an "off-time" for switching element M1. The "off-time", and the resulting actual PWM signal 114, may be generated such that the switching frequency and current ripple of switching voltage regulator 100 during an over-current condition are similar to the switching frequency and current ripple of switching voltage regulator 100 during normal operation (i.e., without an over-current condition). Therefore, in comparison to conventional regulators operating in or near over-current conditions, an efficiency of switching voltage regulator 100 may be increased and disturbances of output voltage Vout may decreased.

Figure 2:
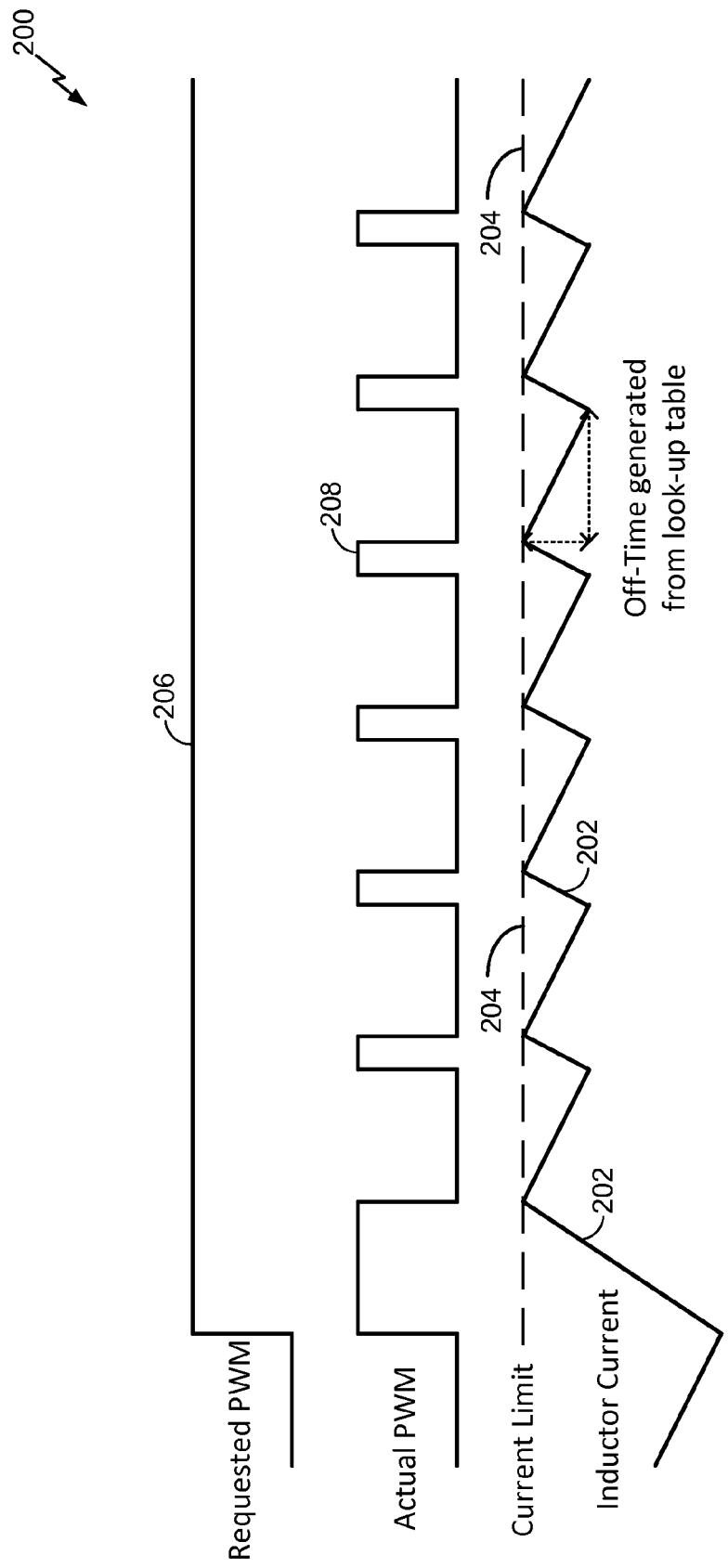
FIG. 2 is a plot illustrating various signals related to a switching voltage regulator, according to an exemplary embodiment of the present invention.

FIG. 2 is a plot 200 illustrating various signals related to a switching voltage regulator, such as switching voltage regulator 100. With reference to FIGS. 1 and 2, plot 200 includes a signal 202, which represents an output current of a switching voltage regulator, such as a current through inductor L. In addition, plot 200 illustrates a current limit 204 relative to the current depicted by signal 202. Plot 200 further includes a signal 206 that represents a PWM signal, such as requested PWM signal 112 conveyed from controller 102 to PWM module 104. In addition, plot 200 includes a signal 208, which represents a modified PWM signal, such an actual PWM signal conveyed by PWM module 104. As illustrated in plot 200, signal 202, which represents the output current, is at, or near current limit 204 during an over-current condition. It is noted that during an over-current condition, signal 202 is increased to current limit 204 during a first time period and decreased during a second time period (i.e., the "off-time" determined by PWM module 204).

Figure 3:
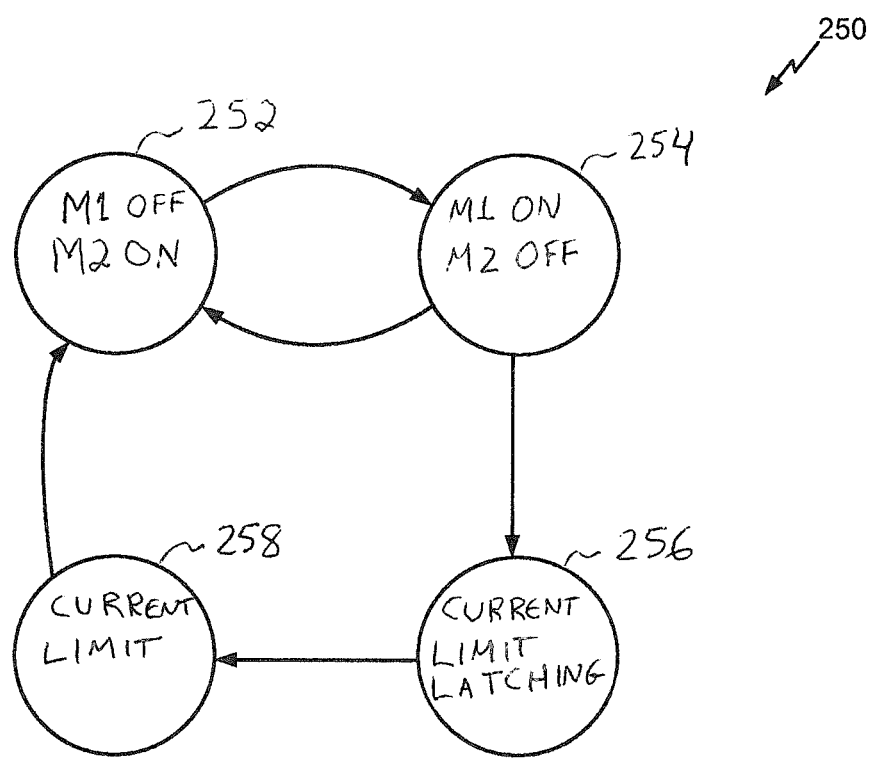
FIG. 3 is a state diagram of a switching voltage regulator, according to an exemplary embodiment of the present invention.

FIG. 3 depicts a state diagram 250 illustrating a contemplated operation of switching voltage regulator 100 (see FIG. 1). State diagram 250 includes states 252, 254, 256, and 258. For example only, state 252 represents a state wherein switching element M2 is in a conductive state and switching element M1 is in a non-conductive state. Further, state 254 represents a state wherein switching element M1 is in a conductive state and switching element M2 is in a non-conductive state. In addition, state 256 represents a current limit latching state and state 258 represents a current limit state.

During operation, upon requested PWM signal 112 transitioning from a low state to a high state, switching voltage regulator 100 may transition from state 252 to state 254 (i.e., switching element M1 will transition to a conductive state and switching element M2 will transition to a non-conductive state). Further, upon detection of an over-current condition while in state 254, switching voltage regulator 100 may transition from state 254 to state 256, where the over-current condition will be latched. Subsequently, switching voltage regulator 100 may transition from state 256 to state 258 wherein an "off-time" delay will be initiated. It is noted that the "off-time" delay may be determined by PWM module 104 via a lookup table and based on the programmed switching frequency and the output voltage of switching voltage regulator 100. After completion of the "off-time" delay, switching voltage regulator 100 may transition from state 258 to state 252. It is noted that if, upon switching voltage regulator 100 transitioning from state 258 to state 252, requested PWM signal 112 is in the high state, switching voltage regulator 100 may quickly transition from state 252 to state 254. It is further noted that upon requested PWM signal 112 transitioning from the high state to a low state switching, and without detection of an over-current limit, voltage regulator 100 may transition from state 254 to state 252 (i.e., switching element M2 will transition to a conductive state and switching element M1 will transition to a non-conductive state).

As will be appreciated by a person having ordinary skill in the art, switching voltage regulators have a peak efficiency point, or an output current at which efficiency is maximized. At current significantly above and below the peak efficiency point, efficiency of switching voltage regulator degrades substantially. Moreover, power conversion efficiency is typically very low while operating in the normal power mode with light output loads. Accordingly, pulse-frequency modulation (PFM) and other light-load modes are typically used to increase efficiency for these use cases.

In accordance with other various exemplary embodiments, the present invention may relate to maximizing power conversion efficiency in switching voltage regulators at low output currents. More specifically, according to one exemplary embodiment, a current "burst" may begin when an output voltage of a switching power regulator decreases to a lower threshold voltage. Further, the burst may end when the output voltage is charged to a second, upper threshold voltage. During the burst, an output current (e.g., a current through an inductor) is increased from zero amps to a lowered current limit (i.e., a current limit that is lowered with respect to the current limit described above with reference to FIGS. 1-3). Further, the output current is decreased for a time period (i.e., look-up table (LUT) based "off-time" duration), which is derived from a programmed switching frequency and an output voltage of the switching voltage regulator. The output current is then increased back to the lowered current limit, and this cycle may be repeated until the output voltage exceeds the upper threshold voltage. After the output voltage exceeds the upper threshold voltage, the output current is decreased back to zero amps. The combination of the lowered current limit and the LUT-based "off-time" are designed such that the switching waveform of the switching voltage regulator during the burst closely approximates the switching waveform at a peak efficiency load during normal operation, thus maximizing light load efficiency.

Figure 4:
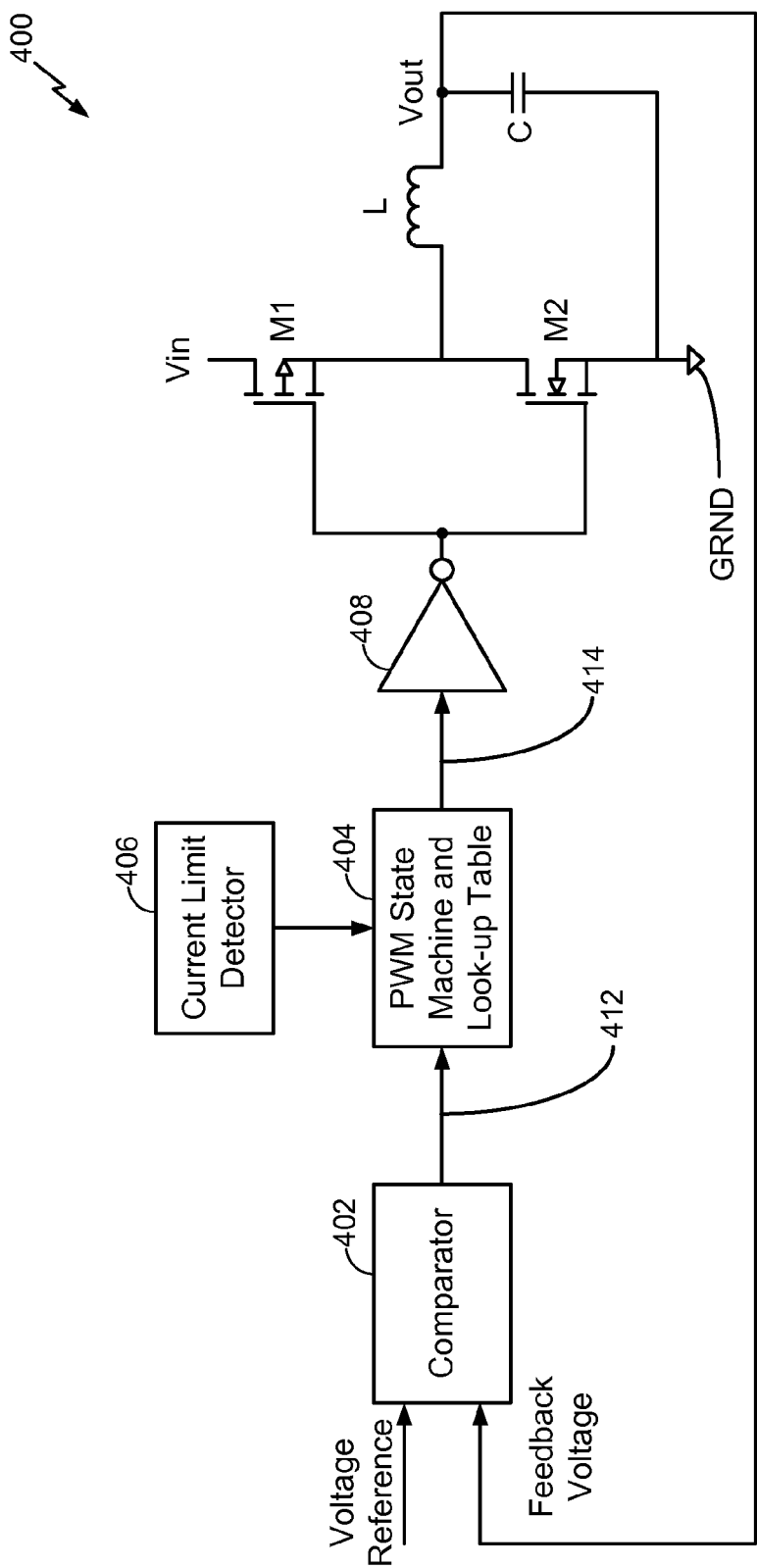
FIG. 4 is another switching voltage regulator, in accordance with an exemplary embodiment of the present invention.

FIG. 4 illustrates a switching voltage regulator 400, according to an exemplary embodiment of the present invention. By way of example only, switching voltage regulator 400 may comprise a buck converter. Switching voltage regulator 400, which is configured to receive input voltage Vin and convey output voltage Vout, includes a hysteretic voltage comparator 402, a PWM state machine and lookup table 404, and a current limit detector 406. It is noted that PWM state machine and lookup table 404 may also be referred to herein as a "PWM module."

Switching voltage regulator 400 further includes an inverter 408, switching element M1, and switching element M2. As illustrated in FIG. 4, switching element M1 is coupled between input voltage Vin and switching element M2, which is further coupled to ground voltage GRND. Switching voltage regulator 400 also includes inductor L and capacitor C, and may be configured to generate output voltage Vout.

Similar to current limit detector 106, current limit detector 406 may be configured to determine if a measured output current (e.g., a current through inductor L) is greater than or equal to a threshold current limit. However, in the embodiment illustrated in FIG. 4, the threshold current limit is reduced (i.e., lowered) with respect to the threshold current described above with reference to FIGS. 1-3. Stated another way, the current limit is lowered from the protection level in a normal power mode to force switching near a peak efficiency point of switching voltage regulator 400. If current limit detector 406 determines that the output current is greater than or equal to the lowered threshold current, current limit detector 406 may convey a signal to PWM state machine and lookup table 404 indicative of an over-current condition.

In addition, hysteretic voltage comparator 402 may be configured to receive a reference voltage and output voltage Vout via a feedback path 410. It is noted that the reference voltage may comprise a lower threshold voltage and an upper threshold voltage. In response to receipt of the reference voltage and output voltage Vout, comparator 402 may generate and convey a comparator output 412 to PWM state machine and lookup table 404. It is noted that comparator output 412 may comprise a high or low signal depending on the comparison between output voltage Vout and the reference voltage. PWM state machine and lookup table 404 may be configured to receive comparator output 412 and the signal from current limit detector 406. Further, PWM state machine and lookup table 404 may be configured to convey an PWM signal 414 to inverter 408, which may convey a signal to a gate of each of switching elements M1 and M2 to cause either switching element M1 or switching element M2 to conduct for generating output voltage Vout.

A contemplated operation of switching voltage regulator 400 will now be described. Upon detecting that output voltage Vout is less than a lower threshold voltage, comparator output 412 may cause an output current (e.g., the current through inductor L) to rise to the lowered current limit. Further, upon detecting an over-current condition (i.e., via current limit detector 404), PWM state machine and lookup table 404 may be configured to generate PWM signal 414 based on output voltage Vout and a programmed switching frequency of switching voltage regulator 400. More specifically, PWM module 404 may, via a lookup table (LUT), and based on the programmed switching frequency and output voltage Vout, generate an "off-time" for switching element M1, which causes the output current to be reduced. The output current is then increased back to the lowered current limit, and this cycle may be repeated until the output voltage exceeds the upper threshold voltage. Upon output voltage Vout exceeding the second, upper threshold voltage, comparator output 412 may cause the output current to decrease back to zero amps. The "off-time", and the resulting PWM signal 414, may be generated such that the switching frequency and current ripple of switching voltage regulator 400 during an overcurrent condition are similar to the switching frequency and current ripple of switching voltage regulator 100 during normal operation (i.e., without an over-current condition). Therefore, in comparison to conventional voltage regulators, an efficiency of switching voltage regulator 400 may be increased.

Figure 5:
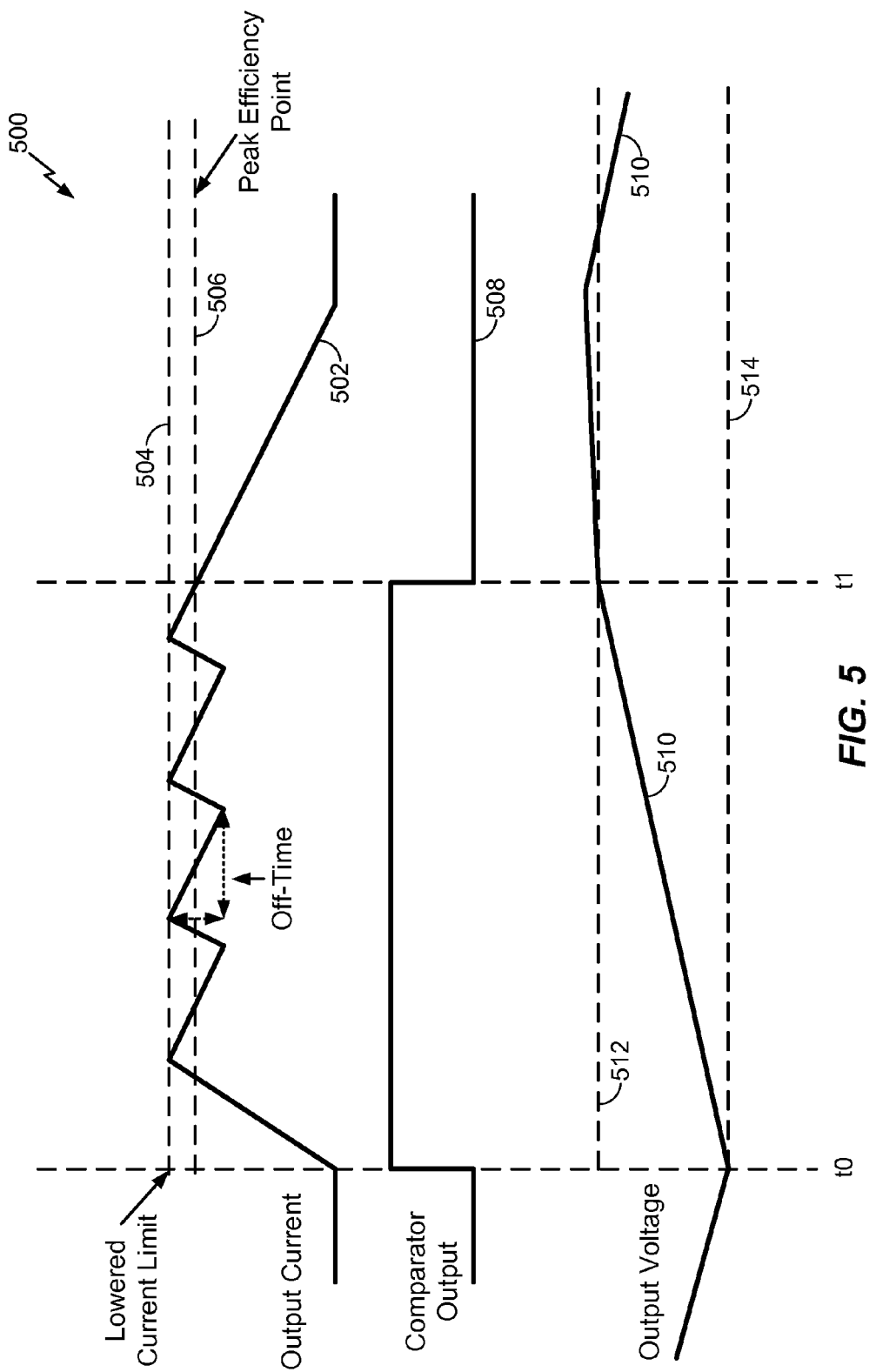
FIG. 5 is another plot illustrating various signals related to a switching voltage regulator, in accordance with an exemplary embodiment of the present invention.

FIG. 5 illustrates another plot 500 illustrating various signals related to a switching voltage regulator, such as switching voltage regulator 400. With reference to FIGS. 4 and 5, plot 500 includes a signal 502, which represents an output current, such as a current through inductor L. In addition, plot 500 illustrates a current limit 504 relative to the current and a peak efficiency point, which is depicted by reference numeral 506. Plot 500 further includes a signal 508 that represents a hysteretic feedback signal, such as comparator output 412 conveyed from comparator 402 to PWM module 404. In addition, plot 500 includes a signal 510, which represents an output voltage, such as output voltage Vout. Plot 500 further depicts an upper threshold voltage 512 and a lower threshold voltage 514 As illustrated in plot 500, as signal 510 (e.g., output voltage Vout) decreases to or below lower threshold voltage 514 at time t0, signal 508 transitions "high." Upon signal 508 going high, signal 502, which represents the output current, is ramped to the lowered current limit 504 and then reduced during an "off-time" of switching element M1. This cycle may be repeated until signal 508 goes low, which occurs when signal 510 (e.g., output voltage Vout) increases to or above upper threshold voltage 512 at time t1. It is noted that while signal 508 is high (i.e. during a current burst), signal 502 is increased to current limit 504 during a first time period and decreased during a second time period (i.e., the "off-time" determined by PWM module 404).

Figure 6:
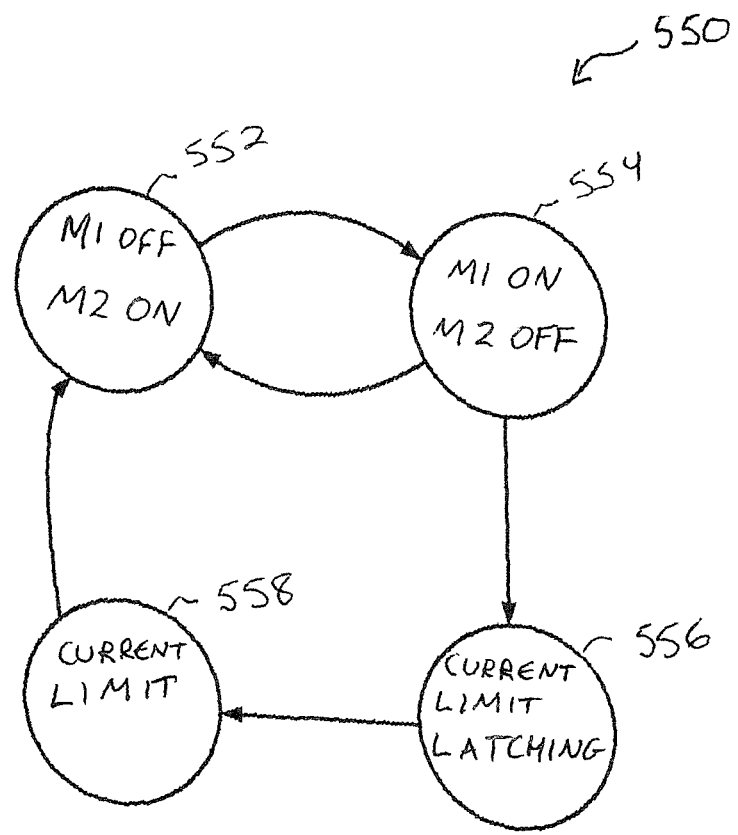
FIG. 6 is another state diagram of a switching voltage regulator, according to an exemplary embodiment of the present invention.

FIG. 6 depicts a state diagram 550 illustrating a contemplated operation of switching voltage regulator 400 (see FIG. 4). State diagram 550 includes states 552, 554, 556, and 558. For example only, state 552 represents a state wherein switching element M2 is in a conductive state and switching element M1 is in a non-conductive state. Further, state 554 represents a state wherein switching element M1 is in a conductive state and switching element M2 is in a non-conductive state. In addition, state 556 represents a current limit latching state and state 558 represents a current limit state.

During operation, upon comparator output 412 transitioning from a low state to a high state, switching voltage regulator 400 may transition from state 552 to state 554 (i.e., switching element M1 will transition to a conductive state and switching element M2 will transition to a non-conductive state). Further, upon detection of an over-current condition while in state 554, switching voltage regulator 400 may transition from state 554 to state 556, where the over-current condition will be latched. Subsequently, switching voltage regulator 400 may transition from state 556 to state 558 wherein an "off-time" delay will be initiated. After completion of the "off-time" delay, switching voltage regulator 400 may transition from state 558 to state 552. It is noted that if, upon switching voltage regulator 400 transitioning from state 558 to state 552, comparator output 412 is in the high state, switching voltage regulator 400 may quickly transition from state 552 to state 554. It is further noted that upon comparator output 412 transitioning from the high state to a low state switching, and without detection of an over-current condition, voltage regulator 100 may transition from state 554 to state 552 (i.e., switching element M2 will transition to a conductive state and switching element M1 will transition to a non-conductive state).

Figure 7:
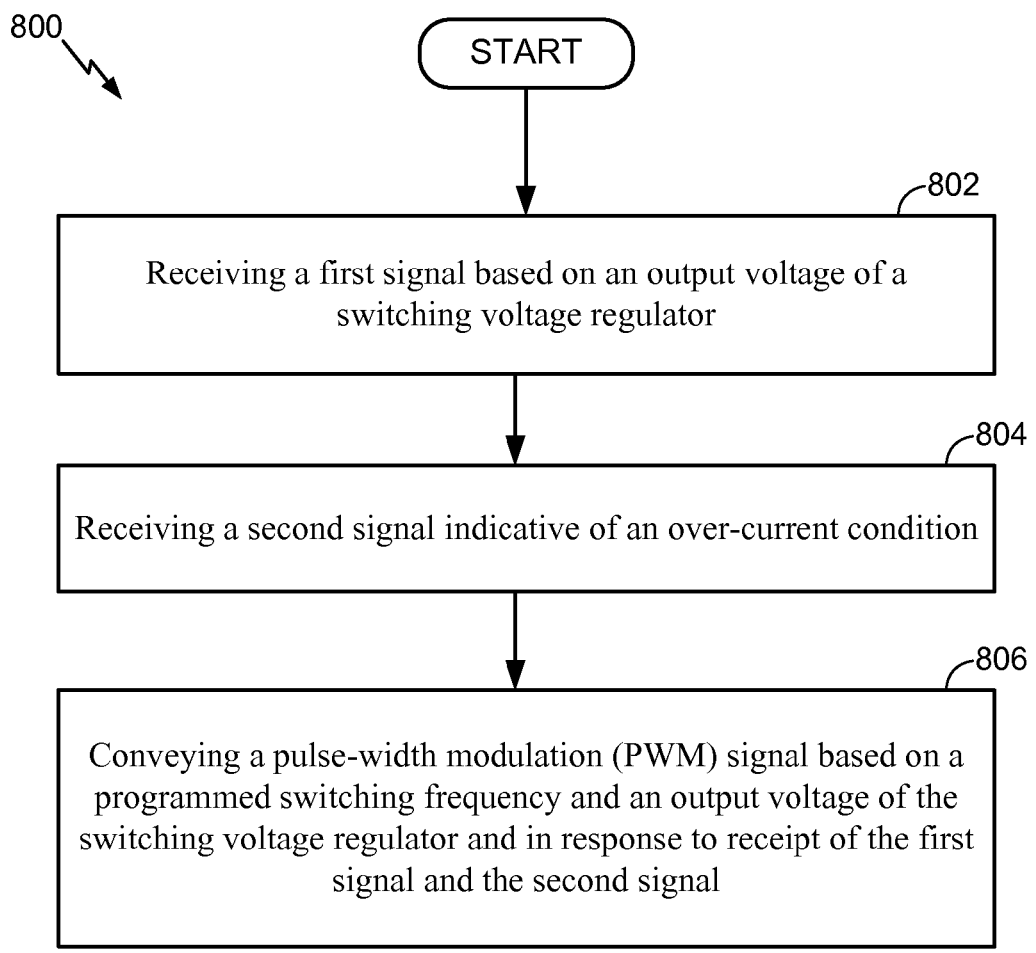
FIG. 7 is a flowchart illustrating a method, according to an exemplary embodiment of the present invention.

FIG. 7 is a flowchart illustrating a method 800, in accordance with one or more exemplary embodiments. Method 800 may include receiving a first signal based on an output voltage of a switching voltage regulator (depicted by numeral 802). Method 800 may also include receiving a second signal indicative of an over-current condition (depicted by numeral 804). Further, method 800 may include conveying a pulse-width modulation (PWM) signal based on a programmed switching frequency and an output voltage of the switching voltage regulator and in response to receipt of the first signal and the second signal (depicted by numeral 806).

Figure 8:
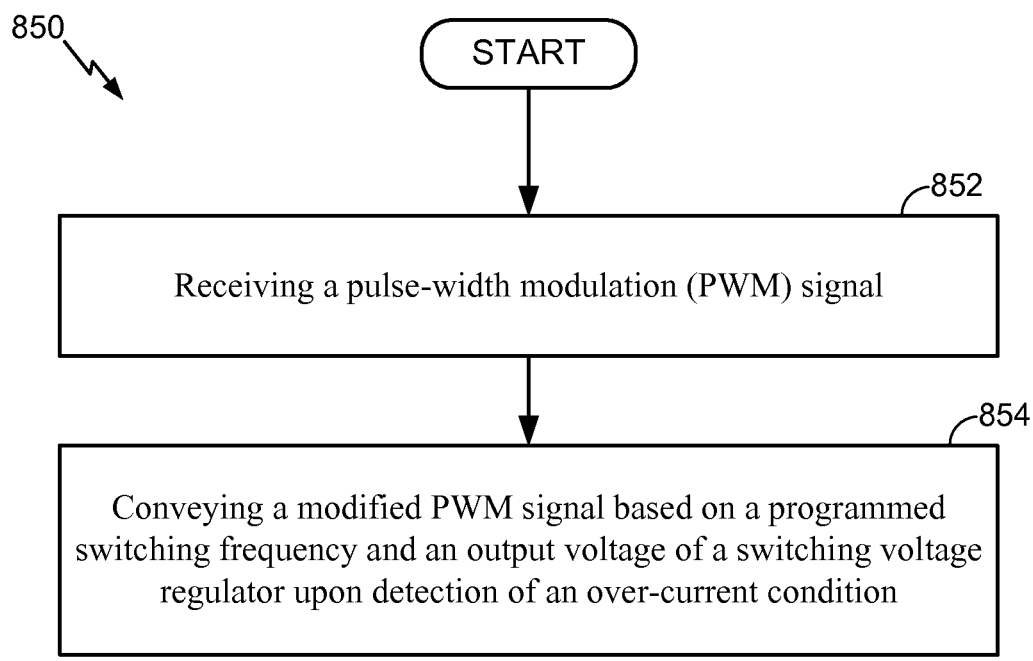
FIG. 8 is a flowchart illustrating another method, according to an exemplary embodiment of the present invention.

FIG. 8 is a flowchart illustrating a method 850, in accordance with one or more exemplary embodiments. Method 850 may include receiving a pulse-width modulation (PWM) signal (depicted by numeral 852). Method 850 may also include conveying a modified PWM signal based on a programmed switching frequency and an output voltage of a switching voltage regulator upon detection of an over-current condition (depicted by numeral 854).

Figure 9:
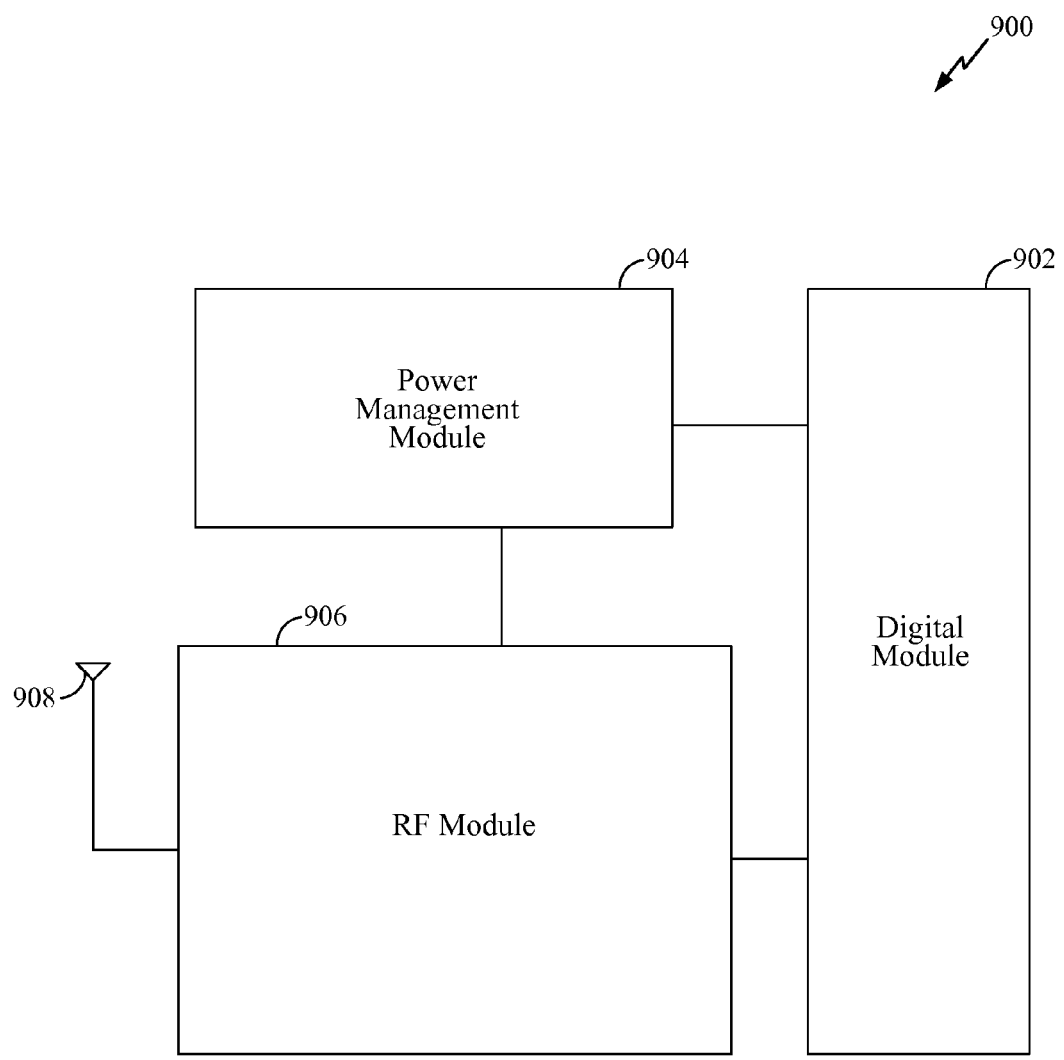
FIG. 9 illustrates a system including a voltage regulator, in accordance with an exemplary embodiment of the present invention.

FIG. 9 is a block diagram of a wireless communication device 900. In this exemplary design, wireless communication device 900 includes digital module 904, an RF module 906, and power management module 904. Digital module 204 may comprise memory and one or more processors. RF module 906, which may comprise a radio-frequency integrated circuit (RFIC) may include a transceiver including a transmitter and a receiver and may be configured for bi-directional wireless communication via an antenna 908. In general, wireless communication device 900 may include any number of transmitters and any number of receivers for any number of communication systems, any number of frequency bands, and any number of antennas. Further, power management module 904 may include one or more voltage regulators, such as switching voltage regulators 100 and 400, respectively illustrated in FIGS. 1 and 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A voltage regulator, comprising:
   a current limit detector configured to detect an over-current condition when an output current meets a first current limit;
   a pulse-width modulation (PWM) module coupled to the current limit detector and configured to convey a PWM signal based on a programmed switching frequency and an output voltage and in response to the over-current condition, wherein an OFF-time of the PWM is determined from a lookup table and derived from the programmed switching frequency and the output voltage, and
   wherein the output current is increased to a second current limit lower than the first current limit and then decreased for the OFF-time, the increase and the decrease occurring one or more times until the output voltage reaches a threshold.

2. The voltage regulator of claim 1, wherein the PWM module is configured to receive another PWM signal, wherein the another PWM signal comprises a requested signal and wherein the PWM is signal modified with respect to the another PWM signal.

3. The voltage regulator of claim 1, further comprising a controller coupled to the PWM module and configured to convey a requested signal to the PWM module.

4. The voltage regulator of claim 1, further comprising a voltage comparator coupled to the PWM module and configured to receive the output voltage and a reference voltage and convey a signal to the PWM module based on a comparison of the output voltage to at least one reference voltage.

5. The voltage regulator of claim 4, wherein the PWM module is configured to generate the PWM signal for causing a current burst, and wherein the current burst is initiated upon the output voltage decreasing to a lower threshold voltage and terminated upon the output voltage increasing to the threshold.

6. The voltage regulator of claim 5, wherein the current burst is configured to cause the output current to increase to the second current limit for a first time period and decrease for a second time period, and wherein a duration of the second time period is based on the programmed switching frequency and the output voltage.

7. The voltage regulator of claim 1, wherein the over-current condition occurs for a duration of time, the PWM signal is configured to cause the output current to increase to the first current limit for a first time period and decrease for a second time period during the over-current condition, and a duration of the second time period is based on the programmed switching frequency and the output voltage.

8. The voltage regulator of claim 1, wherein the PWM module is configured to determine the "OFF-time" and wherein the OFF-time comprises an OFF-time of a switching element of the voltage regulator upon detection of the over-current condition.

9. The voltage regulator of claim 1, wherein the PWM module is configured to determine the "OFF-time", and wherein the OFF-time comprises an OFF-time of a switching element of the voltage regulator upon the output voltage decreasing to a threshold voltage.

10. A voltage regulator, comprising:
    a current limit detector configured to detect an over-current condition when an output current meets a first current limit;
    a pulse-width modulation (PWM) module coupled to the current limit detector and configured to receive a first PWM signal and a convey a second, modified PWM signal based on a programmed switching frequency and an output voltage and in response to a signal indicative of the over-current condition, wherein an OFF-time of the PWM signal is determined from a lookup table and derived from the programmed switching frequency and the output voltage, and
    wherein the output current is increased to a second current limit lower than the first current limit and then decreased for the OFF-time, the increase and the decrease occurring one or more times until the output voltage reaches a threshold.

11. The voltage regulator of claim 10, wherein the second, modified PWM signal is configured to cause the output current to increase to the first current limit for a first time period and decrease for a second time period during the over-current condition, a duration of the second time period based on the programmed switching frequency and the output voltage.

12. A method, comprising:
    receiving a first signal based on an output voltage of a switching voltage regulator;
    receiving a second signal indicative of an over-current condition that occurs when an output current meets a first current limit; and
    conveying a pulse-width modulation (PWM) signal based on a programmed switching frequency and an output voltage of the switching voltage regulator and in response to receipt of the first signal and the second signal, wherein an OFF-time of the PWM signal is determined from a lookup table and derived from the programmed switching frequency and the output voltage, and
    wherein the output current is increased to a second current limit lower than the first current limit and then decreased for the OFF-time, the increase and the decrease occurring one or more times until the output voltage reaches a threshold.

13. The method of claim 12, wherein receiving the first signal comprises receiving a requested PWM signal from a controller and conveying the PWM signal comprises conveying a modified PWM signal.

14. The method of claim 12, wherein receiving the first signal comprises receiving a comparator output signal.

15. The method of claim 12, further comprising comparing a measured output current to one of a threshold current and a lowered threshold current to detect the over-current condition.

16. The method of claim 15, wherein comparing a measured output current comprises measuring a current through an inductor coupled to an output of the switching voltage regulator.

17. The method of claim 12, wherein conveying the PWM signal comprises generating the PWM signal including the "OFF-time".

18. The method of claim 12, wherein the conveying comprises:
   initiating a current burst upon the output voltage decreasing to a lower threshold voltage; and
   terminating the current burst upon the output voltage increasing to the threshold.

19. The method of claim 18, wherein initiating the current burst comprises increasing the output current to the second current limit for a first time period and decreasing the output current for a second time period, and wherein decreasing the output current is based on the programmed switching frequency and the output voltage.

20. The method of claim 12, wherein conveying the PWM signal comprises increasing the output current to the first current limit for a first time period and decreasing the output current for a second time period during the over-current condition, a duration of the second time period based on the programmed switching frequency and the output voltage.

21. A method, comprising:
   receiving a pulse-width modulation (PWM) signal; and
   conveying a modified PWM signal based on a programmed switching frequency and an output voltage of a switching voltage regulator upon detection of an over-current condition receiving a second signal indicative of an over-current condition that occurs when an output current meets a first current limit, wherein an OFF-time of the PWM signal is determined from a lookup table and derived from the programmed switching frequency and the output voltage, and
   wherein the output current is increased to a second current limit lower than the first current limit and then decreased for the OFF-time, the increase and the decrease occurring one or more times until the output voltage reaches a threshold.

22. The method of claim 21, wherein conveying the PWM signal comprises increasing the output current to the first current limit for a first time period and decreasing the output current for a second time period during the over-current condition, a duration of the second time period based on the programmed switching frequency and the output voltage.

23. A device, comprising:
   means for receiving a pulse-width modulation (PWM) signal; and
   means for conveying a modified PWM signal based on a programmed switching frequency and an output voltage of a switching voltage regulator upon detection of an over-current condition that occurs when an output current meets a first current limit, wherein an OFF-time of the PWM signal is determined from a lookup table and derived from the programmed switching frequency and the output voltage and
   wherein the output current is increased to a second current limit lower than the first current limit and then decreased for the OFF-time, the increase and the decrease occurring one or more times until the output voltage reaches a threshold.

24. The device of claim 23, the means for conveying a modified PWM signal comprising means for increasing the output current to the first current limit for a first time period and decreasing the output current for a second time period during the over-current limit condition, a duration of the second period based on the programmed switching frequency and the output voltage.

\* \* \* \* \*